US008463482B2

(12) United States Patent
Rains et al.

(10) Patent No.: US 8,463,482 B2
(45) Date of Patent: Jun. 11, 2013

(54) APPARATUS AND METHOD FOR PREDICTING THE HEALTH OF A POWER TRANSMISSION

(75) Inventors: Mark A. Rains, Indianapolis, IN (US); Brett R. Caldwell, New Palestine, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 1188 days.

(21) Appl. No.: 12/019,086

(22) Filed: Jan. 24, 2008

(65) Prior Publication Data

US 2008/0228340 A1 Sep. 18, 2008

Related U.S. Application Data

(60) Provisional application No. 60/895,004, filed on Mar. 15, 2007.

(51) Int. Cl.
*G01M 17/00* (2006.01)
*G06F 17/00* (2006.01)
*G06F 19/00* (2006.01)
*G01L 25/00* (2006.01)
*F16D 48/00* (2006.01)

(52) U.S. Cl.
USPC ....... 701/29.1; 701/29.4; 701/30.2; 701/31.3; 192/70.251; 192/70.252; 475/158

(58) Field of Classification Search
USPC ................ 701/29, 30, 31, 35, 51, 53, 58, 64, 701/67, 68, 1, 29.1, 29.4, 30.2, 30.3, 31.3, 701/36; 192/70.11, 70.251, 70.252; 475/158
See application file for complete search history.

(56) References Cited

U.S. PATENT DOCUMENTS

| | | | |
|---|---|---|---|
| 5,072,390 A | 12/1991 | Lentz et al. | |
| 5,234,090 A * | 8/1993 | Haka | 192/70.252 |
| 6,285,942 B1 | 9/2001 | Steinmetz et al. | |
| 6,292,732 B1 | 9/2001 | Steinmetz et al. | |
| 6,580,993 B2 * | 6/2003 | Rosi et al. | 701/56 |
| 6,687,586 B2 * | 2/2004 | Hardtle et al. | 701/30 |
| 6,915,890 B1 | 7/2005 | Whitton et al. | |
| 2002/0062188 A1 * | 5/2002 | Rosi et al. | 701/56 |
| 2002/0077730 A1 | 6/2002 | Hardtle | |
| 2003/0033062 A1 * | 2/2003 | Nishina | 701/35 |
| 2004/0061603 A1 * | 4/2004 | Mack | 340/453 |
| 2005/0216159 A1 | 9/2005 | Whittton | |
| 2006/0149433 A1 * | 7/2006 | Otsubo et al. | 701/29 |
| 2007/0124039 A1 * | 5/2007 | Sakurai et al. | 701/29 |
| 2008/0004764 A1 * | 1/2008 | Chinnadurai et al. | 701/29 |

* cited by examiner

*Primary Examiner* — Thomas Tarcza
*Assistant Examiner* — Edward Pipala
(74) *Attorney, Agent, or Firm* — Quinn Law Group, PLLC

(57) ABSTRACT

An improved method for predicting the health of a power transmission and an apparatus for practicing the same are provided. The method includes: monitoring a total number of converged shifts after a first shift has converged; determining if the total number of converged shifts is greater then a calibrated number of completed converged shifts; if yes, determining an initial clutch volume, an initial free running clearance, a free running clearance, and a free running clearance per face and monitoring a change in free running clearance per face; determining if either the free running clearance per face is greater than a calibrated free running clearance per friction surface for failure or if the change in free running clearance per face is greater than a calibrated change in free running clearance per friction surface for failure; if yes, activating a service indicator configured to warn vehicle occupants that transmission service is required.

19 Claims, 3 Drawing Sheets

APPARATUS AND METHOD FOR PREDICTING THE HEALTH OF A POWER TRANSMISSION

CLAIM OF PRIORITY AND CROSS-REFERENCE TO RELATED APPLICATIONS

This application claims priority to U.S. Provisional Patent Application No. 60/895,004, filed on Mar. 15, 2007, which is hereby incorporated by reference in its entirety.

TECHNICAL FIELD

The present invention pertains generally to methods for predicting the health of an automatic transmission and devices for practicing the same.

BACKGROUND OF THE INVENTION

Most automatic transmissions used in motorized vehicles include a number of gear elements, generally in the nature of one or more planetary gear sets, for coupling the transmission's input and output shafts. Traditionally, a related number of hydraulically actuated torque establishing devices, such as clutches and brakes (the term "torque transmitting device" used hereinafter to refer to both clutches and brakes), are selectively engageable to activate the aforementioned gear elements for establishing desired forward and reverse speed ratios between the transmission's input and output shafts. The speed ratio is defined as the transmission input speed divided by the transmission output speed. The transmission input shaft is generally selectively connectable to the vehicle engine (e.g., through a fluid coupling device such as a torque converter), whereas the output shaft is connected through a "drive train" directly to the vehicle wheels.

Shifting from one speed ratio to another is performed in response to engine throttle and vehicle speed, and generally involves releasing one or more "off-going" clutches associated with the current or attained speed ratio, and applying one or more "on-coming" clutches associated with the desired or commanded speed ratio. To perform a "downshift", the transmission transitions from a low speed ratio to a high speed ratio. The downshift is accomplished by disengaging a clutch associated with the lower speed ratio, and contemporaneously engaging a clutch associated with the higher speed ratio, thereby reconfiguring the gear set to operate at the higher speed ratio. Shifts performed in the above manner are termed clutch-to-clutch shifts and require precise timing in order to achieve high quality shifting.

The quality of a shift operation (e.g., a downshift or an upshift) depends upon the cooperative operation of several functions, such as pressure changes within the clutch apply chambers and the timing of control events. Moreover, manufacturing tolerances in each transmission, changes due to component wear, variations in transmission fluid quality and temperature, inordinate piston stroke, fluid leakage, etc., lead to shift quality degradation, and, thus, poor "transmission health".

Traditionally, in order to determine if a transmission is operating unsatisfactorily (i.e., has a "poor transmission health"), the vehicle operator has been required to bring the motor vehicle to a transmission repair and service provider. Once there, the repair provider is required to download all necessary adaptive parameters from the transmission, process the information locally and, based upon a comparative analysis between the post-processed data and a learned normal distribution, determine if the transmission requires servicing. However, it is undesirable to wait until the vehicle operator/owner experiences a transmission malfunction (or other physical indicator warning of a potential problem) before servicing the transmission.

SUMMARY OF THE INVENTION

The present invention provides an improved method for predicting the health of an automatic transmission and an apparatus for practicing the same. According to the present invention, a vehicle controller or transmission computer continuously monitors and processes various transmission parameters, thereby enabling onboard or localized determination of transmission problems. By eliminating the need to download adaptive parameters from the transmission to a service tool and post-process the information to ascertain transmission health, the present invention provides for early notification of potentially serious transmission problems before the problem causes further damage. The present invention also provides for a more accurate assessment of transmission health by taking into consideration parameters not generally accounted for in the prior art, allowing for advance indications of potential transmission problems.

According to one preferred embodiment of the present invention, an improved method or algorithm is provided for predicting the health of an automatic transmission, the transmission having at least one torque transmitting device with a calibrated air volume and a calibrated number of friction surfaces. The method includes: determining a free running clearance; determining a free running clearance per face based at least in part upon the calibrated number of friction surfaces and said free running clearance; determining if the free running clearance per face is greater than a calibrated free running clearance per friction surface for failure; and activating a service indicator configured to signal (e.g., warn vehicle occupants) that transmission service is required in response to the free running clearance per face being greater than the calibrated free running clearance per friction surface for failure. The method preferably also includes determining a current adapted volume. To this regard, determining the free running clearance is preferably based, at least in part, upon the current adapted volume and the calibrated air volume.

Ideally, the method of the present invention also includes the steps of: determining if a first shift has converged; if yes, determining or monitoring a total number of completed converged shifts; determining if the total number of completed converged shifts is greater then a calibrated number of completed converged shifts; if yes, determining an initial clutch volume and an initial free running clearance; determining or monitoring a change in free running clearance per face; and determining if the change in free running clearance per face is greater than a calibrated change in free running clearance per friction surface for failure. In this instance, activating the service indicator is preferably in response to either the free running clearance per face being greater than the calibrated free running clearance per friction surface for failure or the change in free running clearance per face being greater than the calibrated change in free running clearance per friction surface for failure. Desirably, determining the initial free running clearance is based, at least in part, upon the initial clutch volume and the calibrated air volume. In a similar respect, determining the change in free running clearance per face includes accounting for a restored free running clearance.

Optimally, when determining the change in free running clearance per face in the embodiment set forth above, an additional parameter, namely restored free running clearance, is included in the analysis to account for situations where the clutch plates are known to already have a certain amount of wear.

It is also preferred that the method set forth above include determining a percent health of the transmission. Determining the percent health of the transmission includes, but is not limited to, calculating the percent allowable clutch degradation and/or the percent maximum clutch degradation. It is further preferred that these parameters be continuously monitored by the transmission controller, and selectively displayed for a vehicle occupant (e.g., via the service indicator).

According to another preferred embodiment of the present invention, a control apparatus for a transmission is provided. The transmission has an input shaft in powerflow communication with an output shaft, one or more differential gear sets, and one or more clutch mechanisms positioned between the transmission input and output shafts to effect a speed ratio change through selective engagement and disengagement thereof. The transmission also includes one or more fill chambers to which hydraulic fluid is supplied for hydraulically actuating the plurality of clutch mechanisms. The control apparatus includes a controller, also referred to herein as an electronic control unit (ECU), which is in operative communication with the transmission to control the selective engagement and disengagement of the various clutches. The control apparatus also includes a service indicator operatively connected to the controller and configured to warn vehicle occupants that transmission service is required.

The controller is programmed and configured to: monitor a total number of completed converged shifts once a first shift has converged; determine if the total number of completed converged shifts is greater then a threshold or calibrated number of completed converged shifts; determine an initial clutch volume, an initial free running clearance, a free running clearance, and a free running clearance per face; monitor a change in free running clearance per face; and determine if either the free running clearance per face is greater than a threshold or calibrated free running clearance per friction surface for failure or if the change in free running clearance per face is greater than a threshold or calibrated change in free running clearance per friction surface for failure. If so, the controller responds by activating the service indicator to warn vehicle occupants that transmission service is required.

The above objects, features, and advantages, and other objects, features, and advantages of the present invention will be readily apparent from the following detailed description of the preferred embodiments and best mode for carrying out the present invention when taken in connection with the accompanying drawings and appended claims.

DESCRIPTION OF THE PREFERRED EMBODIMENT

The present invention is described herein in the context of a multi-ratio power transmission having a plurality of planetary gear sets, a control unit, and an electro-hydraulic control system. The gear sets and control elements shown in FIG. 1 hereof have been greatly simplified, it being understood that further information regarding the fluid pressure routings and general operation of a power transmission may be found in the prior art. Furthermore, it should be readily understood that FIG. 1 is merely an exemplary application by which the present invention may be incorporated; the present invention is by no means limited to the particular transmission configuration of FIG. 1.

Figure 1:
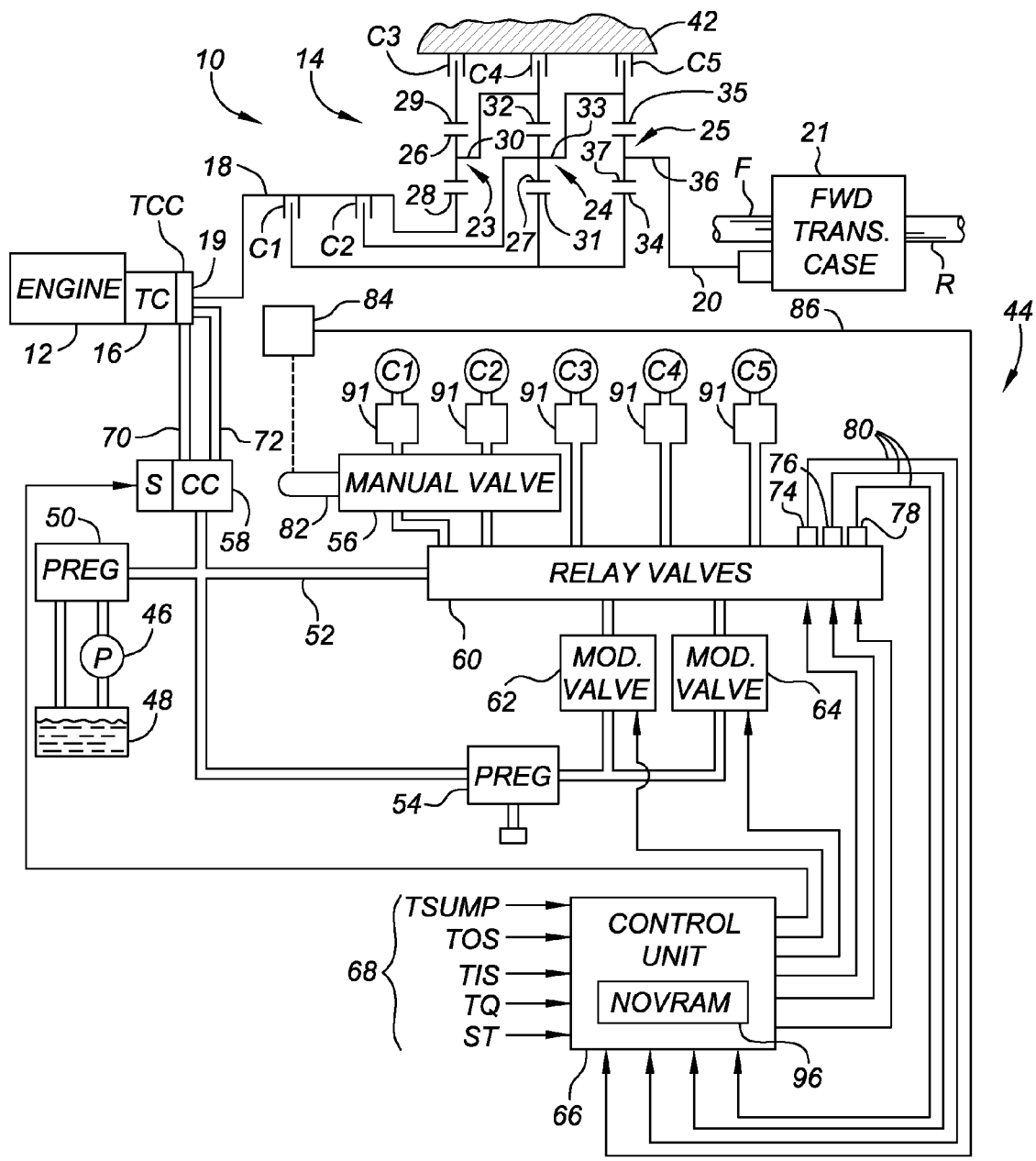
FIG. 1 is a schematic diagram of an exemplary vehicle power train for implementation and practice of the present invention.

Referring to FIG. 1, a vehicle power train, designated generally by the reference numeral 10, includes an engine 12, a multi-speed power transmission 14, and a hydrokinetic torque converter 16 for selectively fluidly coupling engine 12 to the transmission input shaft 18. A torque converter clutch 19 is selectively engaged under certain conditions to provide a direct mechanical coupling between the engine 12 and transmission input shaft 18. Although not required, a transient torque damper (not shown) may be implemented between the engine 12 and the transmission input shaft 18.

The transmission output shaft 20 is coupled to the driving wheels of the vehicle (not shown) in any of several conventional ways. FIG. 1 depicts a four-wheel-drive (4WD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, as well as high or low speed ranges, with a neutral condition occurring intermediate the two and four wheel drive conditions. Recognizably, the present invention can also be incorporated into additional applications not illustrated in FIG. 1, including, but not limited to, all-wheel drive vehicles (AWD), two-wheel-drive vehicles (2WD), etc.

The transmission 14 utilizes three differential gear sets, preferably in the nature of the first, second, and third interconnected planetary gear sets designated generally as 23, 24 and 25, respectively. The first planetary gear set 23 includes an outer gear member 29, typically designated as the ring gear, which circumscribes an inner gear member 28, typically designated as the sun gear, and a planet carrier assembly 30. The planet carrier assembly 30 includes a plurality of pinion gears 26 rotatably mounted on a carrier member and disposed in meshing relationship with both the sun gear member 28 and the ring gear member 29.

In a similar regard, the second planetary gear set 24 includes a sun gear member 31, a ring gear member 32, and a planet carrier assembly 33. The planet carrier assembly 33 includes a plurality of pinion gears 27 rotatably mounted on a carrier member and disposed in meshing relationship with both the sun gear member 31 and the ring gear member 32.

The third planetary gear set 25, similar to the first and second planetary gear sets 23, 24 includes a ring gear member 35 circumscribing a sun gear member 34, and a planet carrier assembly 36. The planet carrier assembly 36 includes a plurality of pinion gears 37 rotatably mounted on a carrier member and disposed in meshing relationship with both the sun gear member 34 and the ring gear member 35. Each of the carriers described above can be either a single-pinion carrier (simple) or a double-pinion carrier (compound).

Still referring to FIG. 1, the input shaft 18 continuously drives the sun gear 28 of the first gear set 23, selectively drives the sun gears 31, 34 of the second and third gear sets 24, 25 via clutch C1, and selectively drives the carrier 33 of the second gear set 24 via clutch C2. The ring gears 29, 32, 35 of planetary gear sets 23, 24, 25 are selectively connected to a stationary member, such as the transmission housing or casing 42, via individual torque transmitting devices, such as brakes C3, C4 and C5, respectively.

The state of the clutches C1-C5 (i.e., engaged or disengaged) can be controlled to provide six forward speed ratios (1, 2, 3, 4, 5, 6), a reverse speed ratio (R) and a neutral condition (N). For example, the first forward speed ratio is achieved by engaging clutches C1 and C5. Downshifting from one forward speed ratio to another is generally achieved by disengaging one clutch—referred to as the "off-going clutch", while engaging another clutch—referred to as the "on-coming clutch". For example, the transmission 14 is downshifted from second to first by disengaging clutch C4 while engaging clutch C5.

The torque converter clutch 19 and the transmission clutches C1-C5 are controlled by an electro-hydraulic control system, generally designated by reference numeral 44. The hydraulic portions of the control system 44 include a pump 46 which draws hydraulic fluid from a sump or reservoir 48, and a pressure regulator 50 for returning a portion of the pump output to reservoir 48 to develop a regulated pressure in line 52. The hydraulic portions of the control system 44 also include a secondary pressure regulator valve 54, a manual valve 56 manipulated by the operator of the vehicle, and a number of solenoid-operated fluid control valves, represented herein by first, second, third, and fourth valves 58, 60, 62 and 64, respectively.

The electronic portion of the electro-hydraulic control system 44 is primarily defined by the transmission control unit or controller 66, which is depicted in FIG. 1 as in a representative embodiment as a microprocessor-based electronic control unit of conventional architecture. The transmission control unit 66 controls the solenoid-operated fluid control valves 58-64 based on a number of inputs 68 to achieve a desired transmission speed ratio. Such inputs may include, but are not limited to, signals representing the transmission input speed (TIS), a driver torque command (TQ), the transmission output speed (TOS), and the hydraulic fluid temperature (TSUMP). The sensors traditionally employed for developing such signals may be conventional in nature, and have been omitted for simplicity and brevity.

A control lever 82 of manual valve 56 is coupled to a sensor and display module 84 that produces a diagnostic signal on line 86 based upon the position of the control lever 82. The aforementioned signal is conventionally referred to as a "PRNDL signal", since it indicates which of the transmission ranges (P, R, N, D or L) has been selected by the vehicle driver. Finally, one or more fluid control or relay valves 60 are provided with a plurality of pressure switches, e.g., 74, 76, 78, for supplying diagnostic signals to control unit 66, e.g., via lines 80, based upon the respective positions of each relay valve 60. The control unit 66, in turn, monitors the various diagnostic signals for the purpose of verifying proper operation of the various controlled elements.

The solenoid-operated fluid control valves 58-64 are generally characterized as being either of the "on/off" or modulated type. The fluid control valves 60 include a set of three on/off relay valves, depicted in FIG. 1 as a consolidated block, that are utilized in concert with manual valve 56 to enable selective actuation (i.e., controlled engagement and disengagement) of each of the clutches C1-C5 with only two modulated valves 62, 64. For any selected ratio, the control unit 66 activates a particular combination of relay valves 60 for coupling one of the modulated valves 62, 64 to the on-coming clutch, and the other one of the modulated valves 62, 64 to the off-going clutch. The modulated valves 62, 64 each comprise a conventional pressure regulator valve (not shown) biased by a variable pilot pressure that is developed by current controlled force motors (not shown). The fluid control valve 58 is also a modulated valve. Valve 58 controls the fluid supply path to converter clutch 19 in lines 70, 72 for selectively engaging and disengaging the converter clutch 19.

Alternatively, instead of modulated valves 62, 64 and relay valves 60, the transmission 14 may include a plurality of individual control valves (not shown) each operatively connected to a respective apply chamber 91. Each control valve is configured to provide fluid to the apply chamber 91 of its respective clutch C1-C5 at either a full feed state or a regulating state.

The transmission control unit 66 of FIG. 1 is configured to determine, among other things, the commands for smoothly engaging the on-coming clutch while smoothly disengaging the off-going clutch, to thereby shift from one speed ratio to another. The transmission control unit 66 develops the corresponding force motor current commands, and supplies current to the respective force motors in accordance with the current commands. Thus, the clutches C1-C5 are responsive to the pressure commands via the valves 58-64 and their respective actuating elements (e.g., solenoids, current-controlled force motors), described in more detail below with respect to FIG. 2.

Figure 2:
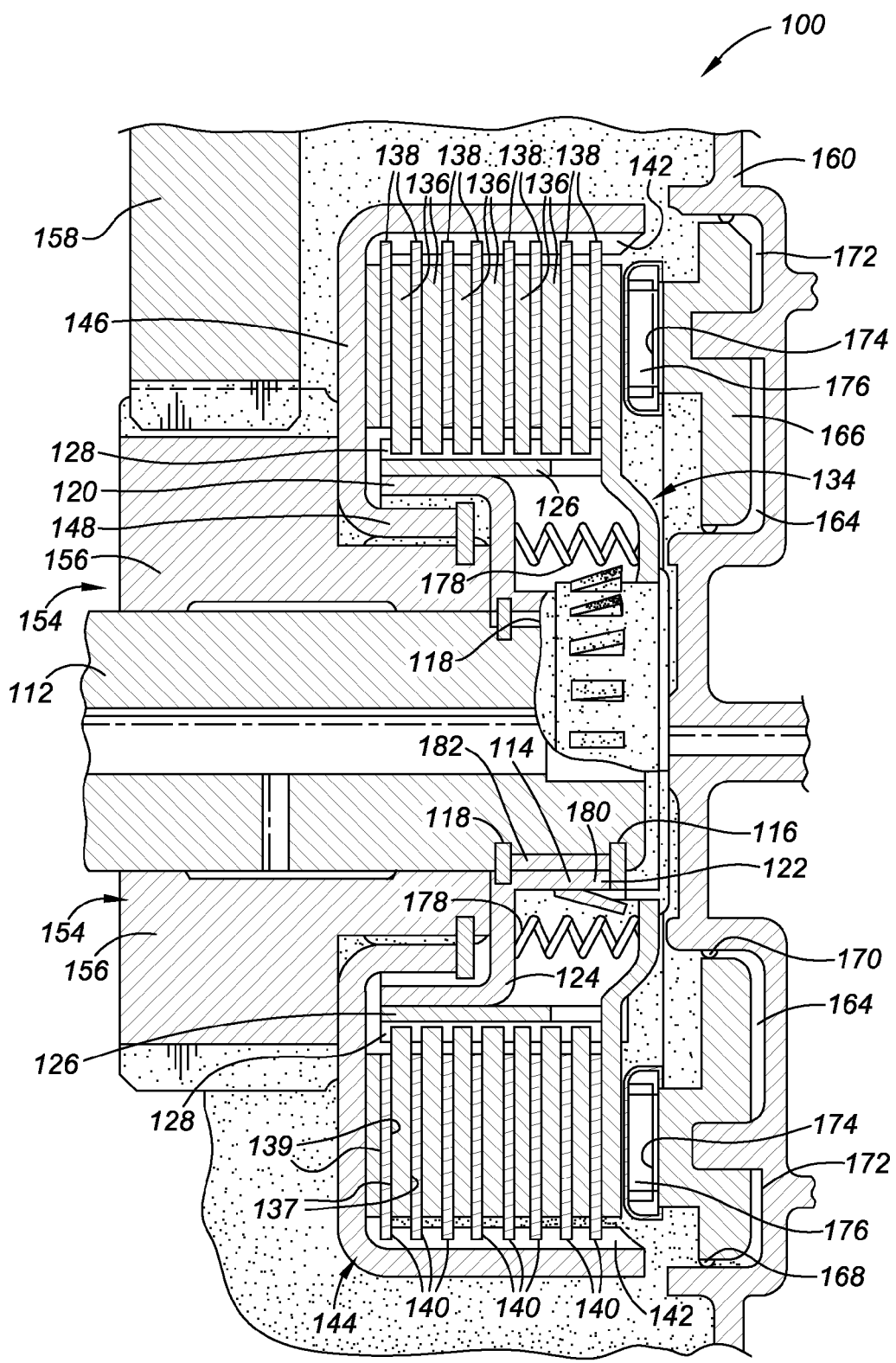
FIG. 2 is a cross-sectional side view of a representative hydraulically actuated friction clutch provided to illustrate the various adaptive parameters used in the present invention to predict transmission health.

In the embodiment illustrated in FIG. 1, the clutches C1-C5 are fluid-operated (e.g., hydraulic), preferably multi-plate, friction devices. FIG. 2 illustrates an exemplary clutch assembly, generally indicated at 100, provided to aid in understanding some key features and parameters of the present invention. The clutch assembly 100 is connected to an input shaft 112, such as transmission input shaft 18 of FIG. 1, having a hub 114 splined thereto. The hub 114 is limited axially along the shaft 112 by first and second locking rings 116, 118, respectively. Alternatively, the hub 114 can be press fit to the shaft 112, or affixed thereto by other conventional means.

A hub wall portion 120 is connected to a hub inner portion 122 by radial wall 124. The wall portion 120 has secured, fixed, or otherwise bonded thereto an axially extending annular sheet ring 126, which has a spline 128 formed therein. A first plurality of friction plates 136 are mounted, fixed, or attached to the ring 126 by an interior splined area which is complementary to the spline 128. The first plurality of friction plates 136 has a coating or layer of friction material 137. A second plurality of friction plates 138 are alternately spaced with the plates 136. The second plurality of friction plates 138 has a coating or layer of friction material 139. Each friction plate 138 has an outer periphery 140 defining an exterior splined area; each exterior splined area is disposed in meshing relationship with a spline 142 formed in an annular housing 144. The first and second plurality of friction plates 136, 138 cooperate to form a conventional clutch pack. The annular housing 144 has an end wall 146 and an inner wall 148 disposed in meshing relationship with a hub portion 154 of a gear member 156, such as sun gear 28 of FIG. 1.

Still referring to FIG. 2, the clutch 100 and gears members 156 and 158 are disposed in a housing or casing 160 which forms an annular chamber 164. A piston 166 is disposed in a slidable manner within the chamber 164, coaxially oriented with the input shaft 112. A plurality of annular lip seals, e.g., 168 and 170, are secured with the annular piston 166, such that a fluid tight chamber 172 is formed by the piston 166 and a portion of the chamber 164. The piston 166 has an engagement face 174 which is disposed to press or abut against one side of a caged needle or roller bearing 176. The other side of the bearing 176 is disposed for rotation with an apply plate 134.

During operation of the clutch 100, the chamber 172 is pressurized, preferably with hydraulic fluid, thereby urging the piston 166 leftward such that the apply plate 134 translates axially to frictionally engage the adjacent faces of the plates 136 and 138. When sufficient force is applied via the piston 166 to the apply plate 134, torque can be transmitted from the shaft 112 to the gear 156 via the clutch assembly 100. The total amount of clearance which must be taken up by stroking piston 166 to gain capacity in clutch 100 is known in the art as the "free running clearance" or clutch clearance. In a similar regard, because each clutch plate 136, 138 has a corresponding friction surface 137,139, respectively, with a thickness, there is an amount of clearance between each individual clutch plate 136,138 which must be taken up by stroking piston 166 to gain capacity in clutch 100. This parameter is known in the art as the "free running clearance per friction surface" or an average clearance per face. Any subsequent change in the thickness of the clutch pack, e.g., deterioration from the initial free running clearance of a new clutch pack, due to wear on the friction material 137, 139 during operation of the clutch assembly 100 or otherwise is measurable and commonly identified in the art as the "change in (delta, Δ) free running clearance". When the pressure in chamber 172 is exhausted, the apply plate 134, and therefore piston 166, will be urged rightward to a disengaged position by the force of a plurality of biasing members, such as coil springs 178. The hub 114 has an axially extending portion 180 on which a spline 182 is formed to provide the drive connection between the shaft 112 and the hub 114.

As noted above, each shift from one speed ratio to another includes a fill or preparation phase during which the chamber 172 (or 91, FIG. 1) of the on-coming clutch is filled in preparation for torque transmission. The shift can be completed using various control strategies. The usual control strategy involves commanding a maximum on-coming clutch pressure for an empirically determined fill time, and then proceeding with the subsequent phases of the shift. The fill time for a given shift can change depending on various factors, resulting in poor shift quality and, thus, a reduced transmission health. The volume of fluid required to fill an apply chamber and thereby cause the clutch to gain torque capacity is referred to as the "clutch volume", which is often used interchangeably in the art with "clutch fill time." If the predetermined fill time is too short and/or the apply chamber is not filled sufficiently, the on-coming clutch will not have sufficient torque capacity when the off-going clutch is released, resulting in what has been coined "engine flare" prior to the next phase of the shift.

Looking again to FIG. 1, the controller 66 determines the timing of the pressure commands based on an estimated on-coming clutch volume, i.e., an estimated volume of fluid required to fill the on-coming clutch apply chamber and thereby cause the on-coming clutch to gain torque capacity. An estimated on-coming clutch volume must be used because the actual on-coming clutch volume may vary over time as a result of wear or internal fluid leakage, and may vary from transmission to transmission because of build variations and manufacturing tolerances. The process of estimating the on-coming clutch volume is described in more detail hereinbelow.

The controller 66 calculates an estimated volume of fluid supplied to the on-coming clutch apply chamber as the chamber is being filled based on a mathematical model of the hydraulic system of transmission 10, and compares the estimated volume of fluid supplied to the estimated clutch volume. Ideally, when the estimated volume of fluid supplied to the apply chamber 91 equals the estimated clutch volume, the on-coming clutch should gain capacity. The model inputs may include the fill pressure, the shift type (ST)—e.g., a 2-1 downshift, the pump speed, and the temperature of the hydraulic fluid (TSUMP). The output of the model is the on-coming clutch flow rate. The flow rate is integrated by an integrator to form the estimated cumulative volume of fluid supplied to the apply chamber 91. If the controller is accurate, the estimated clutch volume remaining will be zero at the time the on-coming clutch gains torque capacity.

Figure 3:
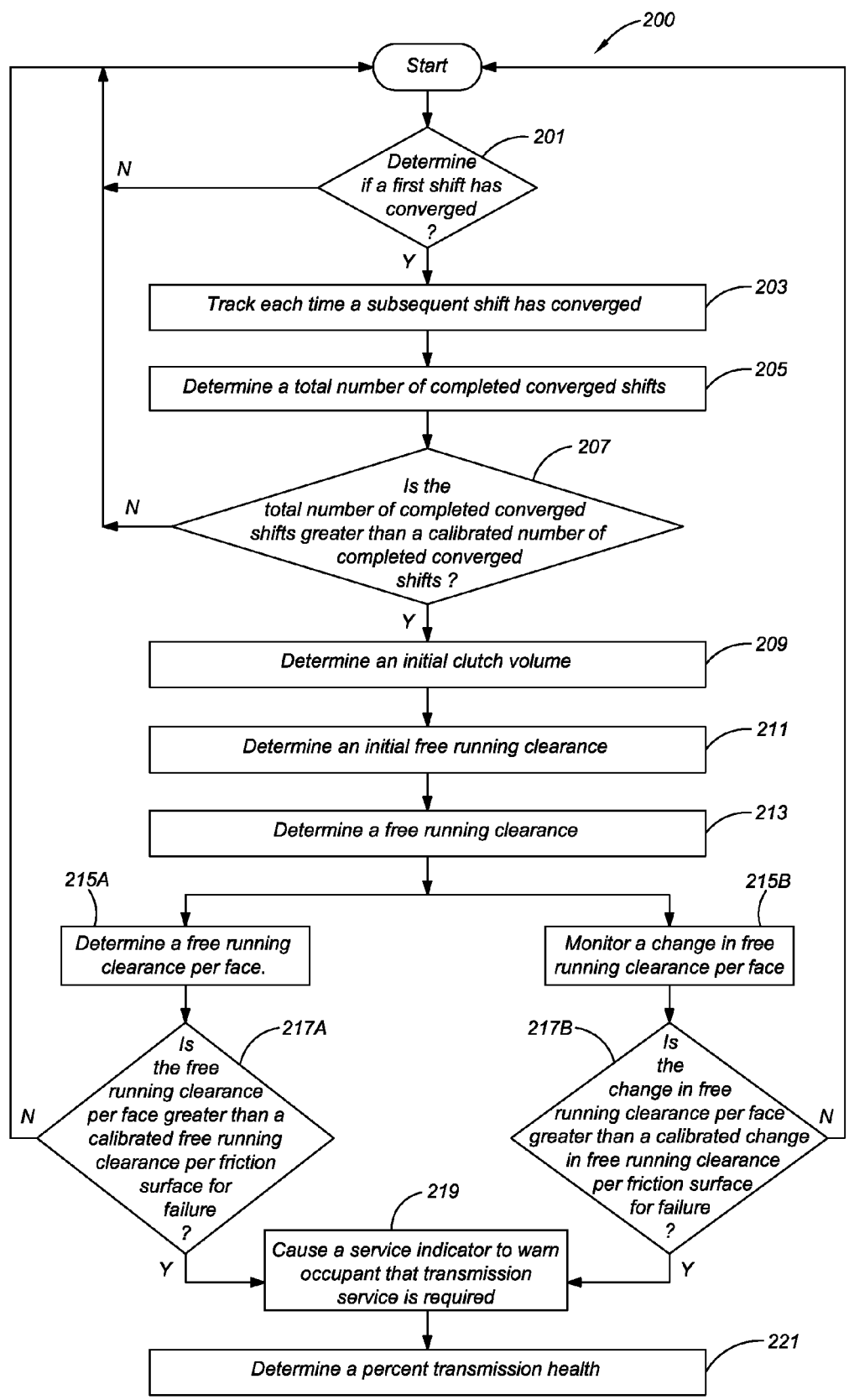
FIG. 3 is a flow chart or block diagram illustrating a method or algorithm for predicting the health of an automatic transmission in accordance with a preferred embodiment of the present invention.

A method of predicting the health of an automatic transmission in accordance with a preferred embodiment of the present invention is depicted in block diagram format in FIG. 3 and indicated generally as 200. The method 200 is described herein with respect to the structure illustrated in FIGS. 1 and 2. However, the present invention may be applied to various other powertrain and transmission configurations without departing from the intended scope of the present invention. In addition, the present invention may be applied to any application employing a controller or ECU and a power transmission having one or more torque transmitting devices.

Transmission health, as issued herein, is intended as an inclusive term to indicative a properly functioning transmission. In the present invention, the adapted clutch volume (ACV) is used to estimate the free running clearance (FRC) and change in (delta) free running clearance (ΔFRC) of a particular clutch, and thereby predict the overall health of the system. By way of example, when the free running clearance (FRC) or change in free running clearance (ΔFRC) becomes exceedingly great, this is generally an indication that either the friction material (e.g., friction material 137, 139, FIG. 2) has worn off the friction plates (e.g., first and second plurality of friction plates 136, 138, FIG. 2), or the stroke of the piston (e.g., piston 166. FIG. 2) is too great due to mechanical problems (e.g., leaks, misalignment, etc.), and the transmission (e.g., 14, FIG. 1) is in need of servicing or a transmission "rebuild". As noted above, without friction material on the clutch plates, the transmission will begin to "slip" and not be capable of transferring torque. Further operation of the transmission could result in additional, avoidable damage.

The terms "learned", "adapted", and "converged" are used interchangeably herein to identify a parameter that is continuously monitored by the transmission controller (e.g., control unit 68 of FIG. 1), and regularly adjusted by the transmission controller to improve shift quality. By way of example, a "converged" shift is a shift wherein all the system parameters are properly adjusted (i.e., have been fully learned) for that particular type of shift, which may be evidenced by a shift wherein no aberrations are detected, and now only requires minor adjustments throughout the life of the transmission.

Looking to FIG. 3, the method 200 includes, as step 201, monitoring the subject clutch assembly (i.e., C1-C5) to determine if a first shift has converged (i.e., when all system parameters have been properly learned for a particular shift operation). Once a shift has fully converged, a counter (e.g., which may be integrated into the programming or software of the controller 66) will begin to increment each time a subsequent shift is properly converged (i.e., completed according to properly learned parameters). Accordingly, step 203 includes continuously monitoring the transmission 10 to track each time a subsequent shift is converged, and, as step 205, determining a total number of converged shifts (TCS). If the total number of converged shifts (TCS) is not greater than the threshold number of completed converged shifts (CCS), the iteration begins again at step 201.

Subsequent to step 205, the controller 66 is to determine if the total number of converged shifts (TCS) is greater than a threshold number of completed converged shifts (CCS), as step 207. Once a predetermined or calibrated number of converged shifts (CCS) have been completed, the current adapted clutch volume (ACV) will be stored and used thereafter as a reference, namely as the initial clutch volume (ICV) for that shift. In other words, if the total number of converged shifts (TCS) is greater than the threshold number of completed converged shifts (CCS), the current adapted volume is stored, and used as a reference as the initial clutch (adapted) volume (IAV) in step 209. By way of example, the current adapted volume (ACV) is determined by starting with an initial volume of fluid in the apply chamber (e.g., 91, FIG. 1), and modifying (e.g., decreasing) the volume on each subsequent shift until a shift event is identified wherein no transmission aberrations are detected (e.g., the expected transmission output speed is achieved for a particular transmission input speed).

The method 200 also includes determining at least one, but preferably both, an initial free running clearance (IFRC) and a free running clearance (FRC), shown respectively in steps 211 and 213. The initial free running clearance (IFRC) is calculated, for example, by subtracting the initial converged volume (ICV) from the calibrated air volume (CAV) (also referred to in the art as "aerated volume" or "air contamination"), the remainder thereafter being multiplied by the calibrated free running clearance scalar (FRCS). IFRC=(ICV−CAV)×FRCS. When a transmission is operating, the hydraulic fluid contains a small amount of air. The flow rate of fluid to each clutch can be measured, i.e., in cubic centimeters per second (cc/sec), and multiplied by the time (sec) to completely compress the clutch. This will give the aerated volume of the clutch. Subtracting the actual fluid volume of the clutch from the aerated volume will result in the calibrated air volume (CAV) of the clutch. Referring to step 213 in FIG. 2, the free running clearance (FRC) is calculated, for example, by subtracting the calibrated air volume (CAV) from the current adapted clutch volume (ACV), and multiplying the remainder by a calibrated free running clearance scalar (FRCS). FRC=(ACV−CAV)×FRCS.

Method 200 further includes determining at least one of, but preferably both, a free running clearance per face (FRCPF), step 215A, and the change in free running clearance per face (ΔFRCPF), step 215B. Because each clutch plate has a corresponding friction surface with a thickness, the average free running clearance per friction surface FRCPF can be calculated by dividing the total free running clearance (FRC) by the number of friction surfaces (CFS). FRCPF=FRC/CFS. The free running clearance per face (FRCPF) is the trigger used to limit the maximum free running clearance allowed.

As the transmission 14 continues to operate, the change in the free running clearance per face (ΔFRCPF) will be continuously monitored (i.e., step 215B of FIG. 3). The change in the free running clearance per face (ΔFRCPF) may be calculated by subtracting the initial free running clearance (IFRC) from the current free running clearance (FRC), and dividing the remainder by the number for friction surfaces (CFS). ΔFRCPF=(FRC−IFRC)/CFS. Optimally, an additional parameter, referred to herein as the restored free running clearance (RFRC), is added to account for cases where the clutch plates are known to already have a certain amount of wear (e.g., in situations where a used transmission is installed and/or the transmission controller has been replaced.) ΔFRCPF=[(FRC−IFRC)/CFS]+RFRC. The delta free running clearance per face (ΔFRCPF) is the trigger used by the system to limit the amount of free running clearance (FRC) allowed to change from its initial "new" state.

Correspondingly, method 200 also includes determining if either the free running clearance per face (FRCPF) is greater than a calibrated or threshold change in free running clearance per friction surface for failure (FRCPFailure), step 217A, or the change in free running clearance per face (ΔFRCPF) is greater than a threshold change in free running clearance per friction surface for failure (ΔFRCPFailure), step 217B. If the free running clearance per face (FRCPF) is not greater than the calibrated free running clearance per friction surface for failure (FRCPFailure) and the change in free running clearance per face (ΔFRCPF) is not greater than the calibrated change in free running clearance per friction surface for failure (ΔFRCPFailure), the iteration or method 200 starts again at step 201.

If either the free running clearance per face (FRCPF) or the change in free running clearance per face (ΔFRCPF) exceeds a calibrated threshold, represented herein as the free running clearance per friction surface for failure (FRCPFailure) and delta free running clearance per friction surface for failure (ΔFRCPFailure), a service indicator (e.g., display module 84, FIG. 1) or like element is actuated to notify the vehicle occupant that a potential transmission problem exists and service should be scheduled. In other words, if the free running clearance per face (FRCPF) is greater than the calibrated free running clearance per friction surface for failure (FRCPFailure), step 219 directs the controller 66 to actuate the service indicator 84 in order to warn vehicle occupants that transmission service is required. Similarly, if the change in free running clearance per face (ΔFRCPF) is greater than the calibrated change in free running clearance per friction surface for failure (ΔFRCPFailure), step 219 directs the controller 66 to actuate the service indicator 84 to warn vehicle occupants that transmission service is required. The service indicator might be visual (e.g. a flashing light), acoustic (e.g. a beeping sound), physical (e.g. a vibrating member), or any combination thereof. Although not ideal, steps 201-205 and 209 may be omitted from the method 200 if steps 211B and 213B are also omitted.

With continuing reference to FIG. 3, it is also preferred that a percent health parameter (PH) be continuously monitored and selectively provided to the vehicle occupant, as indicated in step 219. The percent health (PH) may be calculated for each clutch as the minimum of the percent allowable clutch degradation (% ACD) and/or the percent maximum clutch degradation (% MCD). PH=min (% ACD and % MCD). % ACD=1−[(FRCPF−IFRC)/(FRCPFailure−IFRC)]. % MCD=1−(ΔFRCP/ΔFRCPFailure). For example, the percent health (PH) of clutch C2 is calculated based upon the percent allowable clutch degradation (% ACD) or the percent maximum clutch degradation (% MCD) for both the primary and secondary modes, as discussed above, and a minimum value of the percent health (PH) for C2 clutch is processed and the results provided. These metrics are preferably available without a service tool.

At this point, it should be noted that shift specific parameters (i.e., volumes and pressures) can be learned through more than one method, such as through the process of normal shifting or by running a "routine" with a service tool. Preferably, the routine would be run during vehicle assembly so as to learn all shift specific parameters in advance and, in essence, "converge" the shifts at the assembly plant. If variations between transmission components are very small, shift specific parameters may not need to be learned at all, and can be set to predetermined values.

The method 200 of the present invention preferably includes at least steps 201-219. However, it is within the scope and spirit of the present invention to omit steps, include additional steps, and/or modify the order presented in FIG. 3. It should be further noted that the method 200 depicted in FIG. 3 represents a single cycle in predicting the health of an automatic transmission. As such, it is contemplated, but not required, that the method 200 be applied in a systematic and continuous manner.

While the best modes for carrying out the invention have been described in detail, those familiar with the art to which the instant invention relates will recognize various alternative designs and embodiments for practicing the invention within the scope of the appended claims. As set forth in the claims, various features shown and described in accordance with the various different embodiments of the invention as illustrated may be combined.

The invention claimed is:

1. A method for predicting via a controller the health of an automatic transmission having at least one torque transmitting device with a calibrated air volume and a calibrated number of friction faces, the method comprising:
    determining a free running clearance of the at least one torque transmitting device;
    determining a free running clearance per face of the at least one torque transmitting device;
    determining if said free running clearance per face is greater than a calibrated free running clearance per friction face for failure of the at least one torque transmitting device;
    determining if a shift has converged;
    determining a total number of completed converged shifts when said shift has converged;
    determining if said total number of completed converged shifts is greater than a threshold number of completed converged shifts;
    determining an initial clutch volume if said total number of completed converged shifts is greater than said threshold number of completed converged shifts;
    determining an initial free running clearance of the at least one torque transmitting device;
    determining a change in free running clearance per face of the at least one torque transmitting device;
    determining if said change in free running clearance per face is greater than a calibrated change in free running clearance per friction face of the at least one torque transmitting device for failure; and
    activating a service indicator configured to signal that transmission service is required in response to at least one of said free running clearance per face being greater than said calibrated free running clearance per friction face for failure and said change in free running clearance per face being greater than said calibrated change in free running clearance per friction face for failure.

2. The method of claim 1, further comprising:
    determining a current adapted volume;
    wherein said determining a free running clearance is based at least in part upon said current adapted volume and the calibrated air volume.

3. The method of claim 1, wherein said determining an initial free running clearance is based at least in part upon said initial clutch volume and the calibrated air volume.

4. The method of claim 1, wherein said determining a change in free running clearance per face includes accounting for a restored free running clearance.

5. The method of claim 1, further comprising:
    determining a percent health of the transmission.

6. The method of claim 5, wherein said determining a percent health of the transmission includes calculating at least one of a percent allowable clutch degradation and a percent maximum clutch degradation.

7. The method of claim 6, wherein said service indicator is further configured to selectively provide said percent health of the transmission to vehicle occupants.

8. A method for predicting the health of an automatic transmission having at least one torque transmitting device with a calibrated air volume and a calibrated number of friction faces, said method comprising:
    determining if a shift has converged;
    monitoring a total number of completed converged shifts when said shift has converged;
    determining if said total number of completed converged shifts is greater than a calibrated number of completed converged shifts;
    determining an initial clutch volume if said total number of completed converged shifts is greater than said calibrated number of completed converged shifts;
    determining an initial free running clearance of the at least one torque transmitting device;
    determining a free running clearance of the at least one torque transmitting device;
    monitoring a change in free running clearance per face of the at least one torque transmitting device;
    determining if said change in free running clearance per face is greater than a calibrated change in free running clearance per friction face for failure of the at least one torque transmitting device; and
    activating via a controller a service indicator configured to warn vehicle occupants that transmission service is required in response to said change in free running clearance per face being greater than said calibrated change in free running clearance per friction face for failure.

9. The method of claim 8, further comprising:
    determining a free running clearance per face; and
    determining if said free running clearance per face is greater than a calibrated free running clearance per friction face for failure;
    wherein said activating a service indicator is in response to at least one of said free running clearance per face being greater than said calibrated free running clearance per friction face for failure and said change in free running clearance per face being greater than said calibrated change in free running clearance per friction face for failure.

10. The method of claim 9, further comprising:
    determining a current adapted volume;
    wherein said determining a free running clearance is based at least in part upon said current adapted volume and the calibrated air volume.

11. The method of claim 9, wherein said determining an initial free running clearance is based at least in part upon said initial clutch volume and the calibrated air volume.

12. The method of claim 9, wherein said determining a change in free running clearance per face includes accounting for a restored free running clearance.

13. The method of claim 9, further comprising:
    determining a percent health of the transmission.

14. The method of claim 13, wherein said determining a percent health of the transmission includes calculating at least one of a percent allowable clutch degradation and a percent maximum clutch degradation.

15. The method of claim 14, wherein said service indicator is further configured to selectively provide said percent health of the transmission to vehicle occupants.

16. A control apparatus for a transmission having an input shaft in powerflow communication with an output shaft, at least one differential gear set, at least one clutch mechanism positioned between the transmission input and output shafts and operable to effect a speed ratio change through selective engagement and disengagement thereof, and at least one fill chamber to which hydraulic fluid is supplied for hydraulic actuation of the at least one clutch mechanism, the control apparatus comprising:
- a controller in operative communication with the transmission to control the selective engagement and disengagement of the at least one clutch; and
- a service indicator operatively connected to said controller and configured to warn vehicle occupants that transmission service is required;
- wherein said controller is programmed and configured to monitor a total number of completed converged shifts when a first shift has converged;
- wherein said controller is programmed and configured to determine if said total number of completed converged shifts is greater than a calibrated number of completed converged shifts;
- wherein said controller is programmed and configured to determine an initial clutch volume, an initial free running clearance, a free running clearance, and a free running clearance per face of the at least one clutch;
- wherein said controller is programmed and configured to monitor a change in free running clearance per face of the at least one clutch;
- wherein said controller is programmed and configured to determine if said free running clearance per face is greater than a calibrated free running clearance per friction face for failure of the at least one clutch and if said change in free running clearance per face is greater than a calibrated change in free running clearance per friction face for failure of the at least one clutch; and
- wherein said controller activates said service indicator in response to at least one of said free running clearance per face being greater than said calibrated free running clearance per friction face for failure and said change in free running clearance per face being greater than said calibrated change in free running clearance per friction face for failure.

17. The control apparatus of claim 16, wherein said controller is further programmed and configured to determine a current adapted volume, said determining a free running clearance being based at least in part upon said current adapted volume and the calibrated air volume, and said determining an initial free running clearance being based at least in part upon said initial clutch volume and the calibrated air volume.

18. The control apparatus of claim 17, wherein said controller is further programmed and configured to determine a percent health of the transmission, said percent health of the transmission comprising at least one of a percent allowable clutch degradation and a percent maximum clutch degradation.

19. The control apparatus of claim 18, wherein said determining a change in free running clearance per face includes accounting for a restored free running clearance.

* * * * *